(12) United States Patent
Hull

(10) Patent No.: US 12,341,451 B2
(45) Date of Patent: Jun. 24, 2025

(54) DISTURBANCE COMPENSATING ELECTRIC ACTUATOR POSITION AND SPEED CONTROLLER

(71) Applicant: Simmonds Precision Products, Inc., Vergennes, VT (US)

(72) Inventor: Richard A. Hull, Kissimmee, FL (US)

(73) Assignee: Simmonds Precision Products, Inc., Vergennes, VT (US)

( * ) Notice: Subject to any disclaimer, the term of this patent is extended or adjusted under 35 U.S.C. 154(b) by 124 days.

(21) Appl. No.: 18/137,185

(22) Filed: Apr. 20, 2023

(65) Prior Publication Data

US 2024/0356471 A1    Oct. 24, 2024

(51) Int. Cl.
*H02P 27/06* (2006.01)
*H02P 21/22* (2016.01)

(52) U.S. Cl.
CPC .................... *H02P 21/22* (2016.02)

(58) Field of Classification Search
CPC .......... H02P 21/22; H02P 21/14; H02P 21/13; H02P 6/28; H02P 21/0003; H02P 6/08; H02P 6/17; G05B 6/02; B64C 25/00; B64C 13/50; F42B 10/62
USPC ...................................................... 318/400.02
See application file for complete search history.

(56) References Cited

U.S. PATENT DOCUMENTS

| | | | |
|---|---|---|---|
| 6,667,597 B2 * | 12/2003 | Fedigan | H02P 21/13 318/807 |
| 7,165,465 B2 * | 1/2007 | De Lair | G01M 13/025 73/862.326 |
| 7,403,826 B2 * | 7/2008 | Aghili | G05B 17/02 700/28 |
| 7,424,937 B2 | 9/2008 | Henry et al. | |
| 7,630,813 B2 | 12/2009 | Henry | |
| 8,901,871 B2 * | 12/2014 | Park | G05B 19/19 318/560 |
| 9,533,666 B2 | 1/2017 | Ayichew et al. | |
| 9,995,354 B2 | 6/2018 | Singh | |
| 10,773,748 B2 | 9/2020 | Pramod et al. | |
| 2021/0072708 A1 * | 3/2021 | Hull | H02P 21/14 |
| 2021/0232103 A1 | 7/2021 | Hull | |

FOREIGN PATENT DOCUMENTS

JP     4949786 B2    6/2012
WO    2022234634 A1   11/2022

OTHER PUBLICATIONS

A. Alfehaid et al."Speed Control of Permanent Magnet Synchronous Motor Using Extended High-Gain Observer", American Control Conference (2016).

* cited by examiner

*Primary Examiner* — Gabriel Agared
(74) *Attorney, Agent, or Firm* — Schwegman Lundberg & Woessner, P.A.

(57) ABSTRACT

A method of controlling an actuator includes transmitting a drive signal to an actuator motor to move a device, including automatically compensating for and rejecting uncertain and unmodeled torque disturbances of the actuator motor. A controller for an actuator includes a processing device configured to transmit a drive signal to an actuator motor to move a device, including automatically compensating for and rejecting uncertain and unmodeled torque disturbances of the actuator motor to perform the method.

20 Claims, 9 Drawing Sheets

DISTURBANCE COMPENSATING ELECTRIC ACTUATOR POSITION AND SPEED CONTROLLER

BACKGROUND

1. Field

The present disclosure relates to an actuator controller, and more particularly to a controller that provides for disturbance compensation for an actuation system.

2. Description of Related Art

Electric driven motors are used in a wide variety of applications including both commercial and military applications. A motor is used to drive a moveable mechanism, also referred to as a load, by applying a transmission force, which can be linear force or a torque. The motor receives energy from an electric voltage source such as a battery or generator, and provides a transmission force (linear or torque), to move the mechanism. The motor receives position commands from an external system controller and reports back estimates of updated mechanism position and angular rate as the mechanism is moved. The mechanism itself may be subject to external loading forces or torques, which may be constant, or vary linearly or nonlinearly with deflection of the mechanisms or with external factors such as situational or environmental conditions. External loading forces, including friction and inductive resistance or back electromotive force (EMF), associated with movement of the mechanism in turn cause a reaction torque which counteracts the motor's transmission force.

In a proportional-integral-derivative (PID) feedback control design, the motor's control system is unaware of the reaction torque. Gains applied by the motor's control system for actuating the mechanism are designed to be high enough to overcome a worst-case reaction torque while maintaining minimum performance standards. Torque disturbances act on motors due to effects such as torque ripple, cogging torque, friction, and reaction torque from external loads, among other effects. The torque disturbances are assumed to be unknown and time-varying but bounded. In order to maintain stability, performance, and robustness of the system under varying types and levels of torque disturbances, it is important to be able to detect and provide compensation for such disturbances.

The conventional techniques have been considered satisfactory for their intended purpose. However, there is an ever present need for improved systems and methods for disturbance compensation for actuation systems. This disclosure provides a solution for this need.

SUMMARY

A method of controlling an actuator includes transmitting a drive signal to an actuator motor to move a device, including automatically compensating for and rejecting uncertain and unmodeled torque disturbances of the actuator motor.

Automatically compensating for and rejecting uncertain and unmodeled torque disturbances can include detecting and compensating for the torque disturbances to maintain accurate position and speed of the actuator motor. Automatically compensating for and rejecting uncertain and unmodeled torque disturbances can include using an extended high gain observer to specifically estimate and compensate for high frequency disturbances in the actuator motor.

The high gain observer can incorporate angular wraparound to permit unlimited integration of motor rotor position for the actuator motor. The high frequency disturbances can include at least one of time varying load torques, friction, cogging torque, and torque ripple. Transmitting a drive signal can include commanding the actuator motor for at least one of speed control of the actuator motor or position control of the actuator motor.

The method can further include rate limiting speed of the actuator motor by imposing saturation limits on motor position error of the actuator motor. The method can further include receiving surface position and surface speed commands for the actuator motor, receiving motor position feedback for the actuator motor, receiving direct current feedback from the actuator motor, and receiving quadrature current feedback from the actuator motor. The method can include using a high gain observer receiving the motor position feedback and quadrature current feedback to determine a position estimate, a torque estimate, and a speed estimate. The method can further include using a surface position/speed controller receiving the position estimate, the torque estimate, the speed estimate, and the surface position and surface speed commands to determine a quadrature current command. The method can include using a d-q current controller receiving the quadrature current command, the speed estimate, the quadrature current feedback, and the direct current feedback to output a command for direct current voltage and a command for quadrature voltage for controlling the actuator motor.

The d-q current controller can output the direct current voltage command and the quadrature voltage command to the actuator motor as three-phase, pulse width modulated (PWM) signals. The actuator motor can be connected to actuate a control surface of an airborne platform.

A controller for an actuator includes a processing device configured to transmit a drive signal to an actuator motor to move a device, including automatically compensating for and rejecting uncertain and unmodeled torque disturbances of the actuator motor as described above.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
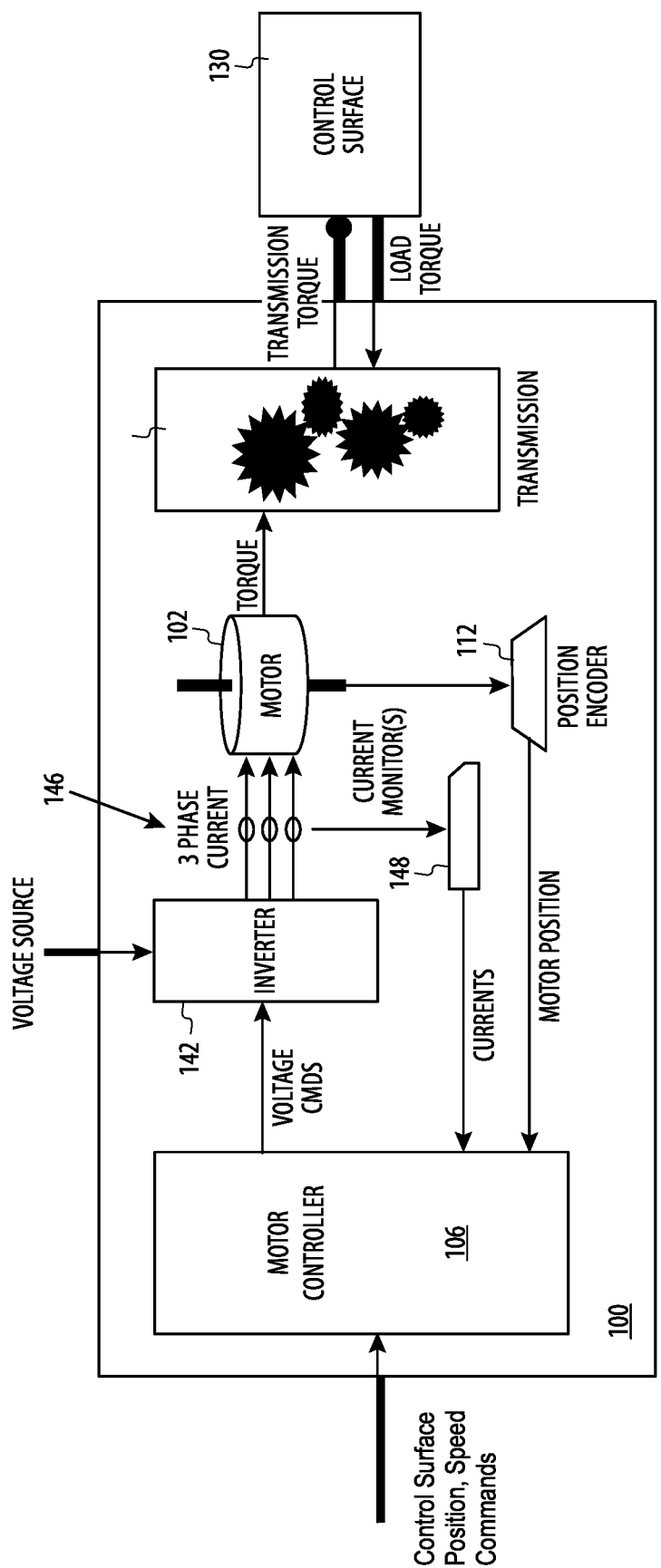
FIG. 1 is a block diagram of an embodiment of an electric motor actuator constructed in accordance with the present disclosure, showing the controller and motor.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-9, as will be described. The systems and methods described herein can be used to provide precision position and/or speed control of actuators in the presence of unknown, nonlinear, time varying torque disturbances such as time varying load torques, friction, torque ripple, and cogging torque.

This disclosure relates to the design of a multivariable feedback controller to provide accurate position and speed control of an electric actuator motor with automatic compensation and rejection of uncertain and unmodeled torque disturbances. An extended high-gain observer is used to estimate the position and speed of the motor, and to estimate the total torque disturbance acting on the motor due to effects such as: torque ripple, cogging torque, friction, and reaction torque from external loads. It is assumed that a permanent magnet synchronous motor (PMSM) is used to precisely position an external control surface, or other device, attached to a rotational shaft that is driven by the motor through a set of gears. Feedback sensors are assumed to provide only the position of the motor shaft and the current from the motor windings. The torque disturbances are assumed to be unknown and time-varying but bounded. Simulation results confirm the stability, performance, and robustness of the system under varying types and levels of torque disturbances.

FIG. 1 shows the components of an electric motor-controlled actuator that is used to control the position or speed of an external control surface. A very common application would be to control the position of a robotic limb or robotic tool, or to control the position of an aerodynamic surface or effector such as an aileron, stabilizer, fin, or canard. In this context it is assumed herein that the goal is to control the angular position of the external surface, however the results could apply equally well to controlling the linear position of an external surface or the angular speed of a rotating device with appropriate assumptions for the gearing mechanisms. It is also assumed herein that the motor is in the class of permanent magnet synchronous motors (PMSMs) which are popular due to their efficiency, small size, power density, low maintenance, and light weight relative to DC and induction motors.

PMSM's however present challenging control problems due to their time-varying nonlinear dynamic behavior and significant torque disturbances caused by torque ripple and cogging torque effects. Torque ripple is a variation in EM torque produced by the motor as a function of the motor current and rotor angle, and cogging torque is an effect caused by attraction of the permanent magnets to the physical windings. Cogging torque is thus a function of motor rotor angle only and is present with or without electrical current to the motor. Both torque ripple and cogging torque are functions of the number of poles of the PMSM. Additional non-linear and time-varying disturbances due to friction in the motor, gears, and bearings, plus load dependent reaction torques reflected to the motor contribute to the challenges of achieving desired performance and robustness. Proportional plus Integral (PI) or proportional plus integral plus derivative (PID) controllers have been commonly used in PMSM drives. However, PI or PID controllers are seen to be not a great choice in applications where high performance and high precision are required.

Figure 2:
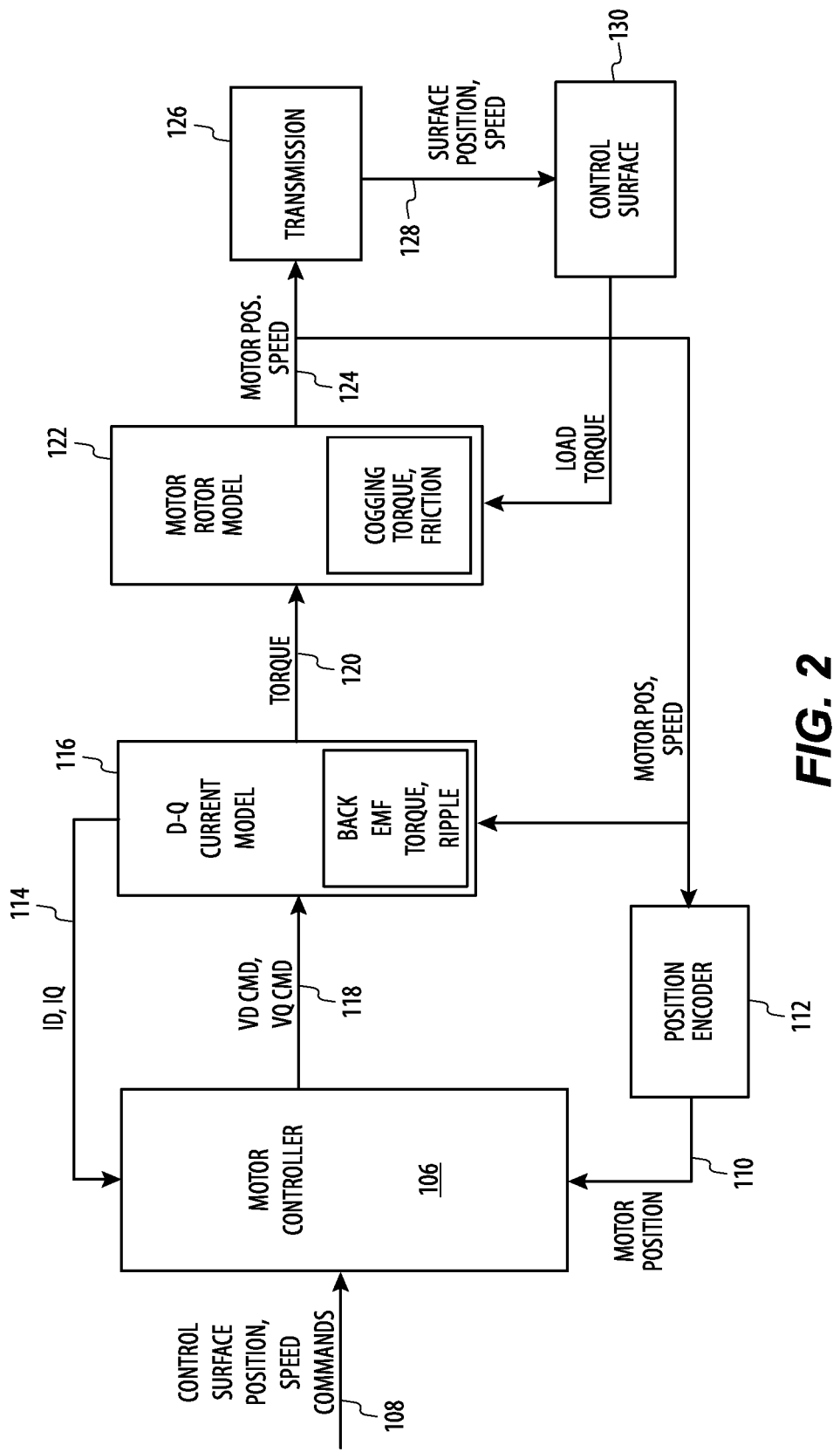
FIG. 2 is a block diagram of an embodiment of permanent magnet synchronous motors (PMSMs) electro-mechanical model constructed in accordance with the present disclosure, showing a d-q current model and motor rotor model.

FIG. 2 presents a block diagram of the electro-mechanical model of the PMSM motor system. The motor operates on 3-phase current represented by Va, Vb, Vc bridge voltages that are supplied in synch with the motor rotor rotational angle by a Pulse Width Modulator (PWM) driving a 3-phase inverter circuit. The PWM switching occurs at very high speed and may be controlled digitally by a Field Programmable Gate Array (FPGA) operating at 10's of Mega Hz. It is assumed that current sensors, such as Hall Effect sensors are sampled at a high rate and provide measurements of the bridge currents iA, iB, iC back to the FPGA controller board. The position of the motor rotor shaft is also provided back to the FPGA controller board by a sensor such as an optical encoder.

To simplify the development and implementation of a position controller, we shall use the d-q coordinate model for the electrical current dynamics that is common in the literature. The d-q current model allows the three phase currents to be converted from the rotating A, B, C frame to a stationary frame of reference relative to the rotor, and vice versa. The current measurements are converted from iA, iB, iC to id and iq by the Clark and Park transforms at a high sample rate on the FPGA board, and the Vd and Vq voltage commands produced by the controller algorithm are converted to Va, Vb, Vc commands by the inverse Park and inverse Clark transforms. Since these algorithms are described in many places in the literature and are not part of the controller algorithms included in this invention, the details of these conversions will be omitted.

D-Q Current Model

The differential equations representing the electrical current in d-q frame are as follows:

$$\frac{di_d}{dt} = -\left(\frac{R}{L_d}\right)i_d - \left(\frac{L_q}{L_d}\right)\omega i_q - \left(\frac{1}{L_d}\right)v_d \quad (1)$$

$$\frac{di_q}{dt} = -\left(\frac{R}{L_q}\right)i_q - \left(\frac{L_d}{L_q}\right)\omega i_d - \left(\frac{1}{L_q}\right)v_q - \left(\frac{k_T}{L_q}\right)\omega \quad (2)$$

Where:
- $i_d$ is the direct current in amps,
- $i_q$ is the quadrature current in amps,
- $v_d$ is the direct input voltage in volts,
- $v_q$ is the quadrature input voltage in volts,
- $\omega$ is the mechanical rotor speed in rad/sec,
- R is the stator winding resistance in ohms,
- $L_d$ is the direct stator inductance in Henries,
- $L_q$ is the quadrature stator inductance in Henries,
- $k_T$ is the motor torque constant in Newton meters per amp.

The motor resistance, inductance, and torque constant parameters above can be converted to the d-q frame from the line-to-line measurements taken from the motor by the following:

$$R = (1/2)R_{bldc}$$

$$L_d = L_q = (2/3)L_{bldc}$$

$$k_T = k_{T_{bldc}}/\sqrt{3}$$

Where $R_{bldc}$, $R_{bldc}$, $L_{bldc}$, $k_{TbIdc}$ are the line-to-line measurements.

Motor Mechanical Model

The differential equations representing the motor mechanical model are:

$$\theta_S = \left(\frac{1}{N}\right)\theta_m \quad (3)$$

$$\dot{\theta}_m = \omega \quad (4)$$

$$\dot{\omega} = -\left(\frac{B}{J}\right)\omega + \left(\frac{k_T}{J}\right)i_q + \left(\frac{T}{J}\right) \quad (5)$$

$$\dot{T} = ? \quad (6)$$

Where:
- $\theta_m \theta_m$, is the angular position of the motor rotor in rad,
- $\theta_S \theta_S$ is the angular position of the surface in rad,
- N N is the gear ratio,
- $\omega$ is the mechanical rotor speed in rad/sec,
- J J is the total inertia at motor in kg m²,
- B is the total viscous friction (damping),
- $k_T$ is the motor torque constant in N m/amp,
- T is the total disturbance torque in N m, and
- ? indicates the dynamics of the disturbance torque are unknown.

The systems and methods in the present disclosure, rely on the use of an extended high gain observer, and incorporates significant improvements in actuator control. Position Control, not just Speed Control is achieved with the present disclosure. Further, with minor modification, the present disclosure can be used for either position control or speed control. Angular wrap-around functions are implemented in the present disclosure to permit unlimited integration of the motor rotor position. Rate limiting of the motor speed is achieved by imposing saturation limits on the motor position error. Anti-windup logic is imposed on integrators to prevent integrator wind-up when certain outputs are saturation limited. The present disclosure has been demonstrated to achieve robust performance for precision position and precision speed control in the presence of significant disturbances caused by cogging torque and torque ripple effects.

Figure 3:
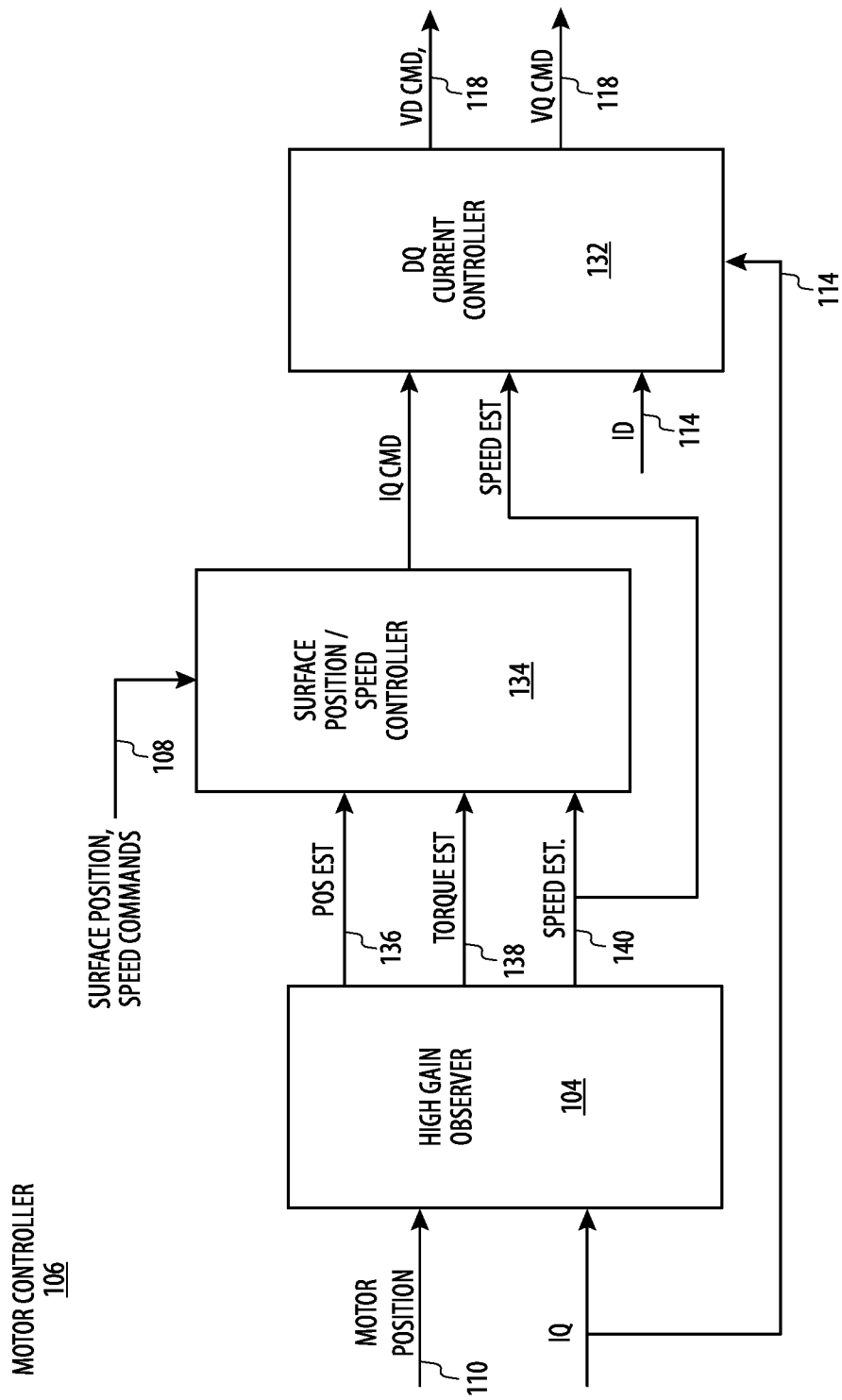
FIG. 3 is a block diagram of an embodiment of a controller algorithm showing the high gain observer, the surface position/speed controller, and the d q current controller.

The control algorithm of the present disclosure involves three modules as illustrated in FIG. 3, a high bandwidth current controller, a high bandwidth extended high-gain observer, and a lower bandwidth position tracking controller. The position tracking controller is derived from the motor mechanical model in equations (3)-(6) and computes the quadrature current, $i_q$, required to track a desired surface position command, $\theta_S^d \theta_S^d$, and/or a surface speed command $\dot{\theta}_S^d \dot{\theta}_S^d$.

THE current controller is derived from the d-q current model equation (1)-(2). Since the direct current, $i_d$, does not produce torque to control the motor the current controller module is designed as a servo loop to provide the quadrature current, $i_q$, required by the position controller and a regulator loop to control the direct current to zero. The extended high gain observer receives the measurements of motor position and current measurements, $i_d$ and $i_q$, and provides estimates of the position of the motor and surface, the speed of the motor and the torque disturbance acting on the motor for use by the other two modules.

The bandwidth of the current controller module can be on the order of 200-400 Hz to keep up with the fast dynamics of the current loop, while the bandwidth of the position controller can be on the order of 20-40 Hz based on the much slower dynamics of the surface position mechanics. Although the motor speed may be several hundred Hz, the surface position is related by the inverse of the gear ratio in equation (6), and the gear ratio may be on the order of 50-100:1.

The bandwidth of the high-gain observer module depends largely on the dynamics of the torque disturbance. Torque disturbances dominated by load torques on the external control surface may be reliably estimated by an observer bandwidth only slightly larger than the bandwidth of the position control module. However significant torque disturbances due to torque ripple, cogging torque and motor friction dictate an observer bandwidth on the order of the current controller bandwidth.

Assuming these control algorithm modules are implemented in digital computations, either conventional computer processor chips or FPGA's, the sample rates of the three modules must be sufficiently high to support the bandwidths of the control algorithms. A good rule-of-thumb is to choose a digital sample rate of at least 20 times the bandwidth of the embedded control algorithm. It may be possible to execute the 3 controller modules at different sample rates based on different bandwidths in a multi-rate processing architecture, or perhaps preferable to execute all at the highest bandwidth of the group.

Design of the Surface Position Controller

Using recursive backstepping design, and assuming full state feedback, we can map the dynamics of the control surface and motor mechanical model to the desired dynamics of a second order system with specified bandwidth $\Omega_p$ and damping $\zeta_p$. Let $\theta_S^d \theta_S^d$ be the desired surface position, and if known $\dot{\theta}_S^d \dot{\theta}_S^d$ the desired surface speed. Formulate the error dynamics as:

$$\ddot{\theta}_S + 2\zeta_p \Omega_p \left(\dot{\theta}_s - \dot{\theta}_s^d\right) + \Omega_p^2 \left(\theta_s - \theta_s^d\right) = 0 \quad (7)$$

Noting that $$\theta_S = \left(\frac{1}{N}\right)\theta_m, \dot{\theta}_S = \left(\frac{1}{N}\right)\dot{\theta}_m = \left(\frac{1}{N}\right)\omega, \text{ and } \ddot{\theta}_S = \left(\frac{1}{N}\right)\dot{\omega}, \theta_S = \left(\frac{1}{N}\right)\theta_m$$

we can substitute the actual dynamics of the control surface into the desired dynamics of equation (7):

$$\left(\frac{1}{N}\right)\dot{\omega} + 2\zeta_p \Omega_p \left(\left(\frac{1}{N}\right)\omega - \dot{\theta}_s^d\right) + \Omega_p^2 \left(\left(\frac{1}{N}\right)\theta_m - \theta_s^d\right) = 0$$

Then solving for $\dot{\omega}$ and replacing it with equation (4):

$$-\left(\frac{B}{J}\right)\omega + \left(\frac{k_T}{J}\right)i_q + \left(\frac{T}{J}\right) = -2\zeta_p \Omega_p \left(\omega - N\dot{\theta}_s^d\right) - \Omega_p^2 \left(\theta_m - N\theta_s^d\right) \quad (8)$$

Solving equation (8) for $i_q$ gives the control input to the surface position controller that will provide the desired tracking dynamics. This becomes the desired reference input $i_q^{ref} i_q^{ref}$ for the current controller.

$$i_q^{ref} = \left(\frac{B}{k_T}\right)\omega - \left(\frac{1}{k_T}\right)T - 2\zeta_p \Omega_p \left(\frac{J}{k_T}\right)\left(\omega - N\dot{\theta}_s^d\right) - \left(\frac{J}{k_T}\right)\Omega_p^2 \left(\theta_m - N\theta_s^d\right) \quad (9)$$

If all the states and parameters are known, equation (9) will provide zero steady state tracking error for a constant input $\theta_S^d$ or a ramp input given by $\dot{\theta}_S^d$. Note that near perfect tracking of a sinusoidal input can be achieved by setting $\theta_S^d$=A sin(wt), $\dot{\theta}_S^d$=Aw cos(wt) in equation (9). Since direct measurements are not available for $\omega$ and T, these values will be replaced by their estimated values, $\hat{\omega}$ and $\hat{T}$ from the high-gain observer. The estimated motor position, $\hat{\theta}_m$ from the high gain observer provides a smooth interpolation of the motor position encoder measurements and will also be used in equation (9) in place of $\theta_m$.

Replacing the states with their estimates in equation (9) and rearranging to get a gain times feedback form for the controller:

$$i_q^{ref} = k_{c1}\left(\theta_m - N\theta_s^d\right) + k_{c2}\left(\omega - N\dot{\theta}_s^d\right) + k_{c3}\omega + k_{c4}T \quad (10)$$

Where:
$\theta_S^d$=desired angular position of the surface,
N=the gear ratio,
$\hat{\omega}$=estimated mechanical motor rotor speed,
$\dot{\theta}_S^d$=desired angular rate of the surface,
$\hat{\theta}_S^d$=estimated angular position of the motor rotor,
$\hat{T}$=estimated total disturbance torque
and the gains are calculated as:

$$k_{c1} = -\left(\frac{J}{k_T}\right)\Omega_p^2, k_{c2} = -2\left(\frac{J}{k_T}\right)\zeta_p\Omega_p, k_{c3} = \left(\frac{B}{k_T}\right), k_{c4} = -\left(\frac{1}{k_T}\right)$$

to give the desired bandwidth, $\Omega_p$, and damping, $\zeta_p$, of the transient response.

Design of the D-Q Current Controllers

The DQ current model given by equations (1) and (2) is a coupled nonlinear Multiple-Input Multiple-Output system. The goal is to achieve output tracking of the state variable $i_q$ while simultaneously regulating the state variable $i_d$ to zero, by the two input control variables $v_d$ and $v_q$. The method of the present disclosure will be to use Feedback Linearization to map the error between the desired states and actual feedback measurements for $i_d$ and $i_q$ to two decoupled PI systems, and then solve for the input voltages required to achieve stable systems with desired dynamics.

First create the error states:

$$\epsilon_d = i_d - i_d^{ref}, \epsilon_q = i_q - i_q^{ref}$$

Adding an integrator to each control loop, we create the integral error "wiggle" systems, which we would like to map to a stable second order linear systems with bandwidth, $\Omega_c$, and damping, $\zeta_c$:

$$\ddot{\tilde{\epsilon}} + 2\zeta_c\Omega_c\dot{\tilde{\epsilon}} + \Omega_o^2\tilde{\epsilon} = 0 \quad (11)$$

We define the states of the "wiggle" system:

$$\tilde{\epsilon} = \int \epsilon dt, \dot{\tilde{\epsilon}} = \epsilon, \ddot{\tilde{\epsilon}} = \dot{\epsilon}$$

Substituting the two D-Q current model equations (1) and (2), into the integral error "wiggle" system of equation (11):

$$-\left(\frac{R}{L_d}\right)i_d + \left(\frac{L_q}{L_d}\right)\omega i_q + \left(\frac{1}{L_d}\right)v_d + 2\zeta_c\Omega_c(i_d - i_d^{ref}) + \Omega_c^2 \int (i_d - i_d^{ref})dt = 0 \quad (12)$$

$$-\left(\frac{R}{L_q}\right)i_q + \left(\frac{L_d}{L_q}\right)\omega i_d + \left(\frac{1}{L_q}\right)v_q + \quad (13)$$

$$-\left(\frac{k_Y}{L_q}\right)\omega + 2\zeta_c\Omega_c(i_q - i_q^{ref}) + \omega_c^2 \int (i_q - i_q^{ref})dt = 0$$

We can then solve equations (12) and (13) for the required motor control input voltages:

$$v_d = Ri_d - L_q\omega i_q - 2L_d\zeta_c\Omega_c(i_d - i_d^{ref}) - L_d\Omega_c^2 \int (i_d - i_d^{ref})dt \quad (14)$$

$$v_q = Ri_q - L_d\omega i_d + k_T\omega - 2L_q\zeta_c\Omega_c(i_q - i_q^{ref}) - L_q\Omega_c^2 \int (i_q - i_q^{ref})dt \quad (15)$$

Equations (14) and (15) are nonlinear functions of the overall system because of the products of the motor speed co times the current states $i_d$ and $i_q$. When these nonlinear feedback equations are substituted back into the nonlinear current state equations (1) and (2), "Feedback Linearization" results in the closed loop current dynamics behaving like the desired pair of decoupled linear equations in the error states:

$$\ddot{\tilde{\epsilon}}_d + 2\zeta_c\Omega_c\dot{\tilde{\epsilon}}_d + \Omega_c^2\tilde{\epsilon}_d = 0$$

and $$\ddot{\tilde{e}}_q + 2\zeta_c \Omega_c \dot{\tilde{e}}_q + \Omega_c^2 \tilde{e}_q = 0$$

Equations (14) and (15) can be written in the form of two PI controllers to track the current reference signals with state feedback gains applied to the measured currents and estimated motor speed:

$$v_d = Ri_d - L_q\omega i_q - 2L_d\zeta_c\Omega_c(i_d - i_d^{ref}) - L_d\Omega_c^2 \int (i_d - i_d^{ref})dt \quad (16)$$

$$v_q = Ri_q - L_d\omega i_d + k_T\omega - 2L_q\zeta_c\Omega_c(i_q - i_q^{ref}) - L_q\Omega_c^2 \int (i_q - i_q^{ref})dt \quad (17)$$

and the gains are calculated as:

$$k_{di} = -L_d\Omega_c^2$$
$$k_{qi} = -L_q\Omega_c^2$$
$$k_{dp} = -2L_d\zeta_c\Omega_c$$
$$k_{qp} = -2L_q\zeta_c\Omega_c$$
$$k_{dq11} = R,$$
$$k_{dq21} = L_d$$
$$k_{dq12} = -L_q$$
$$k_{dq22} = R$$
$$k_{dqw} = k_T$$

Equations (16) and (17) compute the voltage commands to the motor in the D-Q frame. As previously discussed, these commands are converted to the bridge voltages, Va, Vb, Vc, which drive the PWM switching commands to the 3-phase inverter circuit at a high sample rate.

Design of the Extended High Gain Observer

The bandwidth of the current controllers is chosen to be much higher than the bandwidth of the surface position controller (100's of Hz vs 10's of Hz), and therefore the combined system can be considered as a two-time scale system. This in turn allows us to design an extended high gain observer by considering only the dynamics of the motor mechanical model in equations (3)-(6).

Although the total torque disturbance, T, acting on the motor is unknown, as is its dynamic rate of change, $\dot{T}$, we will include the torque disturbance in the observer equations and derive an estimate of the total disturbance from the model and the measurements of the motor position and current. In practical applications, significant torque disturbances arise from the load torque caused by moments on the control surface, friction on the motor caused by the shaft, bearings and gears, torque ripple effects from the back EMF of the motor and cogging torque due to the permanent magnets. A very simple model of the torque disturbance is to assume the load torque is proportional to the displacement of the control surface, so that:

$$T = \kappa\left(\frac{1}{N}\right)\theta_m \therefore \dot{T} = \kappa\left(\frac{1}{N}\right)\dot{\theta}_m = \kappa\omega \quad (18)$$

If it is practical to provide a reasonable approximation of $\kappa$ or $\dot{\kappa}$, then it may be beneficial to use equation (18) in place of equation (5) in the observer model, otherwise it will suffice to just set $\dot{T}=0$. Writing equations (3), (4) and (18) then in state space form, we define:

$$x=[\theta_m \omega T]^T, u=i_q$$

then $$\dot{x} = \begin{bmatrix} 0 & 1 & 0 \\ 0 & -\frac{B}{J} & \frac{1}{J} \\ 0 & \kappa & 0 \end{bmatrix} x + \begin{bmatrix} 0 \\ \frac{k_T}{J} \\ 0 \end{bmatrix} u, y = [1\ 0\ 0]x$$

Which conforms to the standard linear model:

$$\dot{x} = Ax + Bu\ \dot{x} = Ax + Bu, y = Cx$$

We can then write the standard Luenberger observer equation:

$$\dot{\hat{x}} = A\hat{x} + Bu + K_{ob}(y - C\hat{x}) \quad (19)$$

Where $\hat{x}$ is the estimated state vector:

$$\hat{x} = \begin{bmatrix} \hat{\theta}_m & \hat{\omega} & \hat{T} \end{bmatrix}^T$$

and y is the measurement of the rotor position.

To design the observer gain vector, $K_{ob}$, first, let the observer gains take the form:

$$K_{ob} = \begin{bmatrix} K_{ob_s} \\ K_{ob_z} \\ K_{ob_s} \end{bmatrix}$$

The closed loop system matrix for the observer is:

$$A_{cl} = A - K_{ob}C = \begin{bmatrix} -K_{ob_1} & 1 & 0 \\ -K_{ob_2} & a_{22} & a_{23} \\ -K_{ob_3} & a_{32} & 0 \end{bmatrix}$$

with $a_{22} = -\frac{N}{J}, a_{23} = \frac{1}{J}, a_{32} = \kappa, b_2 = \frac{k_T}{J}$ The characteristic equation of the closed loop observer system is found from:

$$|sI - A_{cl}| = \begin{Vmatrix} s + K_{ob_1} & -1 & 0 \\ K_{ob_2} & s - a_{22} & -a_{23} \\ K_{ob_3} & -a_{32} & s \end{Vmatrix}$$

Expanding the determinant:

$$|sI - A_{cl}| =$$

$$s^3 + (K_{ob_1} - a_{22})s^2 + (K_{ob_2} - K_{ob_1}, a_{22} - a_{23}a_{32})s + K_{ob_2}a_{23} - k_{ob_1}a_{23}a_{32}$$

We can now design the observer gains to control the eigenvalues of the closed loop observer system. One control solution is to equate the coefficients of the characteristic polynomial to those of a 3rd order Butterworth polynomial with bandwidth W:

$$P_3 = s^3 + 2Ws^2 + 2W^2s + W^3$$

We then solve for the observer gains in terms of the desired bandwidth, W, of the closed loop observer system:

$$k_{ob_s} = 2W + a_{22}$$

$$K_{ob_a} = 2W^2 + 2Wa_{22} + a_{22}^2 + a_{23}a_{32}$$

$$K_{ob_s} = \frac{1}{a_{23}}W^3 + 2Wa_{32} + a_{23}a_{32}$$

The observer equations can then be written:

$$\hat{\theta}_m = \hat{\omega} + K_{ob_1}(\theta_m - \hat{\theta}_m) \quad (20)$$

$$\dot{\hat{\omega}} = a_{22}\hat{\omega} + a_{23}\hat{T} + b_2 i_q + K_{ob_2}(\theta_m - \hat{\theta}_m) \quad (21)$$

$$\hat{T} = a_{32}\hat{\omega} + K_{ob_3}(\theta_m - \hat{\theta}_m) \quad (22)$$

Where $\hat{\theta}_m$ is the estimate of the motor rotor position, $\hat{\omega}$, is the estimate of the motor speed, and $\hat{T}$ is the estimate of the torque disturbance. The estimate of the torque disturbance provided by equation (22) is capable not only of estimating the reaction torque at the motor due to an external load, but also the total disturbance at the motor including torque ripple, cogging torque and friction. Co-designing the surface position controller to take advantage of this estimate provides additional robustness to disturbances and uncertainty in the system.

A special modification to the observer equations above allows the motor rotor position to increase without limit, which is useful for testing the motor controller in the laboratory independently from the gears and control surface, and to utilize the same observer equations for speed control of the motor. The modification is to replace the motor position error term in equations (20), (21), and (22), with an angular error wraparound function defined as:

$$\theta_{err_{wrap}} = \begin{cases} (\theta_m - \hat{\theta}_m) - 2\pi & \text{if } (\theta_m - \hat{\theta}_m) > \pi \\ (\theta_m - \hat{\theta}_m) & \text{if } -\pi \leq (\theta_m - \hat{\theta}_m) \leq \pi \\ (\theta_m - \hat{\theta}_m) + 2\pi & \text{if } (\theta_m - \hat{\theta}_m) < -\pi \end{cases}$$

This ensures that the error function driving the observer equations remains in the region:

$$\{-\pi \leq (\theta_m - \hat{\theta}_m) \leq \pi\}.$$

Furthermore, the integration of $\dot{\hat{\theta}}_m$ in the solution of equation (20) is accomplished with an internal wraparound limit that also maintains the position estimate within the region:

$$\{-\pi \leq \hat{\theta}_m \leq \pi\}.$$

Speed Control Using Velocity Error Tracking

The versatility of this design can be further illustrated by the simplicity of converting the position control loop to a speed control loop. Recalling the position control design equation (7) and removing the position error term:

$$\ddot{\theta}_s + 2\zeta_p \Omega_p (\dot{\theta}_s - \dot{\theta}_s^d) = 0$$

We can rewrite this as a first order differential equation in the control surface speed:

$$\dot{\omega}_s + \Omega_s(\omega_s - \omega_s^d) = 0 \quad (23)$$

where $\omega_s^d$ desired control surface rotational speed, and $\Omega_s$ is the desired bandwidth of the first order speed controller. Again, relating the speed of the control surface to the speed of the motor divided by the gear ratio:

$$\omega_s = \left(\frac{1}{N}\right)\omega \text{ and } \dot{\omega}_S = \left(\frac{1}{N}\right)\dot{\omega}.$$

We then write the speed control design equation in terms of the motor dynamics:

$$\left(\frac{1}{N}\right)\dot{\omega} + \Omega_s\left(\left(\frac{1}{N}\right)\omega - \omega_s^d\right) = 0$$

then again solving the above equation for of and replacing it with equation (4):

$$-\left(\frac{B}{J}\right)\omega + \left(\frac{k_T}{J}\right)i_q + \left(\frac{T}{J}\right) = -\Omega_s(\omega - N\omega_s^d) \quad (24)$$

Solving equation (24) for $i_q$ gives the control input to the surface speed controller that will provide the desired speed tracking dynamics. This replaces the position controller as the desired reference input $i_q^{ref}$ for the d-q current controller module.

Once again replacing the states with their estimates in in equation (24) and rearranging to get a gain times feedback form for the controller, we can arrive at an identical form to equation (10):

$$i_q^{ref} = k_{c1}(\hat{\theta}_m - N\theta_s^d) + k_{c2}(\hat{\omega} - N\omega_s^d) + k_{c3}\hat{\omega} + k_{c4}\hat{T} \quad (25)$$

Where:

$\theta_s^d = 0$ $\omega_s^d$ = desired angular rate of the surface,

N = the gear ratio, $\hat{\theta}_m$ = estimated angular position of the motor rotor, $\hat{\omega}$ = estimated mechanical motor rotor speed $\hat{T}$ = estimated total disturbance torque and the gains are calculated to give the desired bandwidth, $\Omega_s$, of the first order speed controller:

$$k_{c1} = 0, \; k_{c2} = -\left(\frac{J}{k_T}\right)\Omega_s, \; k_{c2} = \left(\frac{B}{k_T}\right), \; k_{c4} = -\left(\frac{1}{k_T}\right)$$

Thus, with no structural changes, the position controller of equation (10) can be converted to a speed controller of equation (25), simply by recomputing the gains. The implementations of the d-q Current Controller and the High Gain Observer remain the same, with the following caveats. To maintain good speed control in the presence of high frequency torque disturbances caused by torque ripple and cogging torque effects when the motor is spinning at high speeds, higher bandwidths may be required for the observer, d-q current controller and the surface speed control loop than were necessary for the position control implementation. In addition, a higher digital sample rate may be necessary to support the higher controller bandwidths.

Simulation Performance Results

For purpose of simulation and to demonstrate non-limiting example, the motor mechanical and electrical parameters were arbitrarily defined for a hypothetical actuator design as shown in Table 1. Computation sample rates, bandwidths, and other parameters necessary for the surface position controller, d-q current controllers and high-gain observer are shown in Table 2.

TABLE 1

Motor Parameters

| Parameter | Value |
|---|---|
| Maximum Voltage | 25.0 Volts |
| Maximum Current | 5.0 Amps |
| Maximum Motor Speed | 200 Hz |
| Gear Ratio N | 100:1 |
| Total Inertia at Motor J | 1.4925e−7 kg · m² |
| Total Viscous Friction B | 3.0e−7 N · m/rad/s |
| Stator Resistance $R_{bldc}$ | 5.0 Ohms |
| Stator Inductance $L_{bldc}$ | 0.4e−3 Henries |
| Motor Torque Constant $k_{T_{bldc}}$ | 2.0 in · oz/amp |

TABLE 2

Controller Design Parameter

| Parameter | Value |
|---|---|
| Controller Sample Rate | 6000 Hz |
| d-q Current Controller BW $\Omega_C$ | 250 Hz |
| d-q Current Controller damping $\zeta_C$ | 1.0 |
| Low-Gain Observer BW W | 30 Hz |
| High-Gain Observer BW W | 250 Hz |
| Surface Load Torque Spring Constant (A Priori Estimate) κ | 0 N · m/rad |
| Position Controller BW $\Omega_p$ | 25 Hz |
| Position Controller damping $\zeta_p$ | 1.0 |

Position Control Examples

Figure 4:
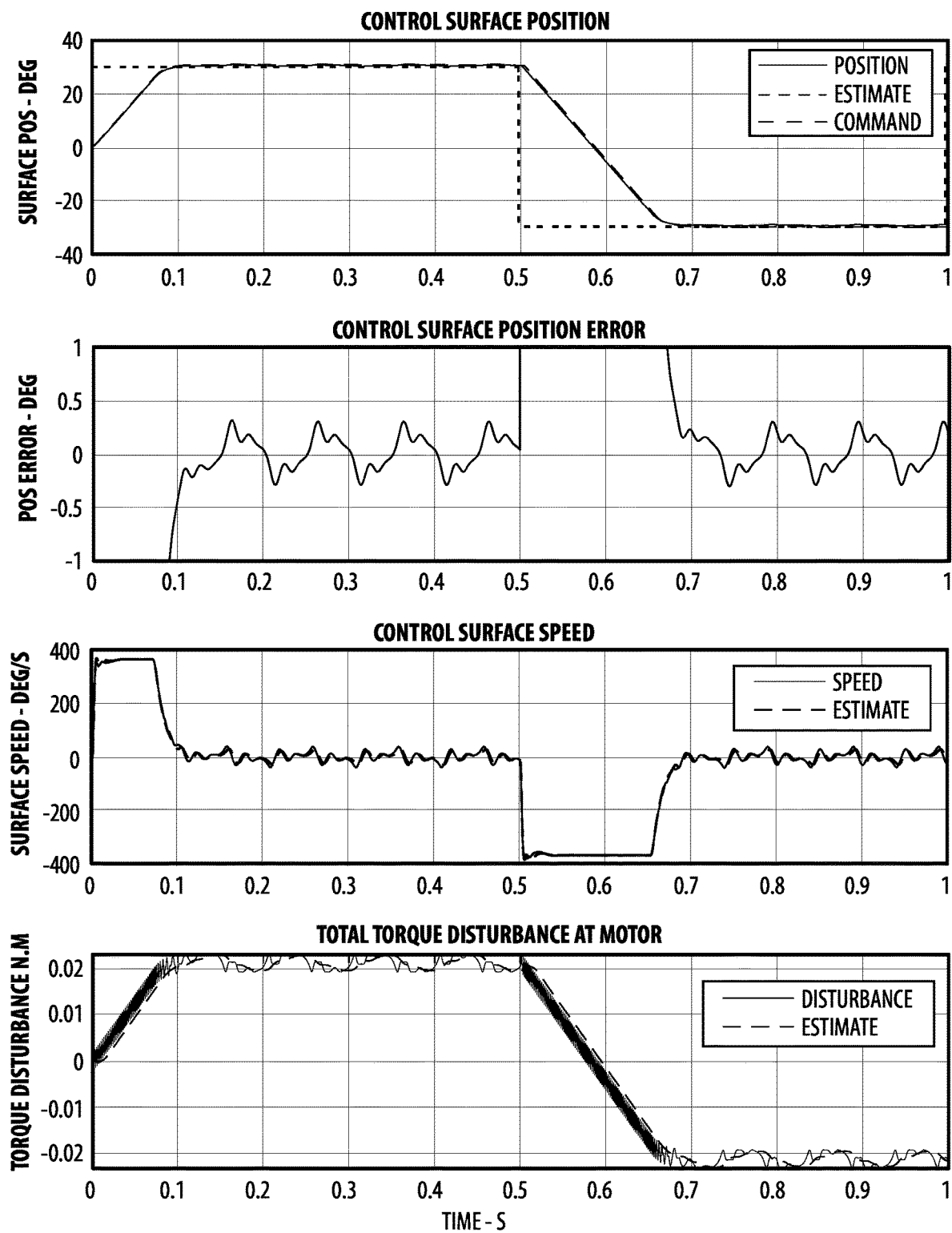
FIG. 4 is a set of graphs for cogging torque disturbance with low gain observer showing a graph for control surface position, a graph for control surface position error, a graph for control surface speed, and a graph for total torque disturbance at the motor.

FIG. 4 shows the simulation results for a square wave position command with a low gain observer bandwidth of 30 Hz when cogging torque is added to the "spring constant" load torque reflected at the motor. In this case the low gain observer is not able to keep up with the higher frequency dynamics of the cogging torque, resulting in significant oscillations on the order of +/−0.3 deg of surface position error.

Figure 5:
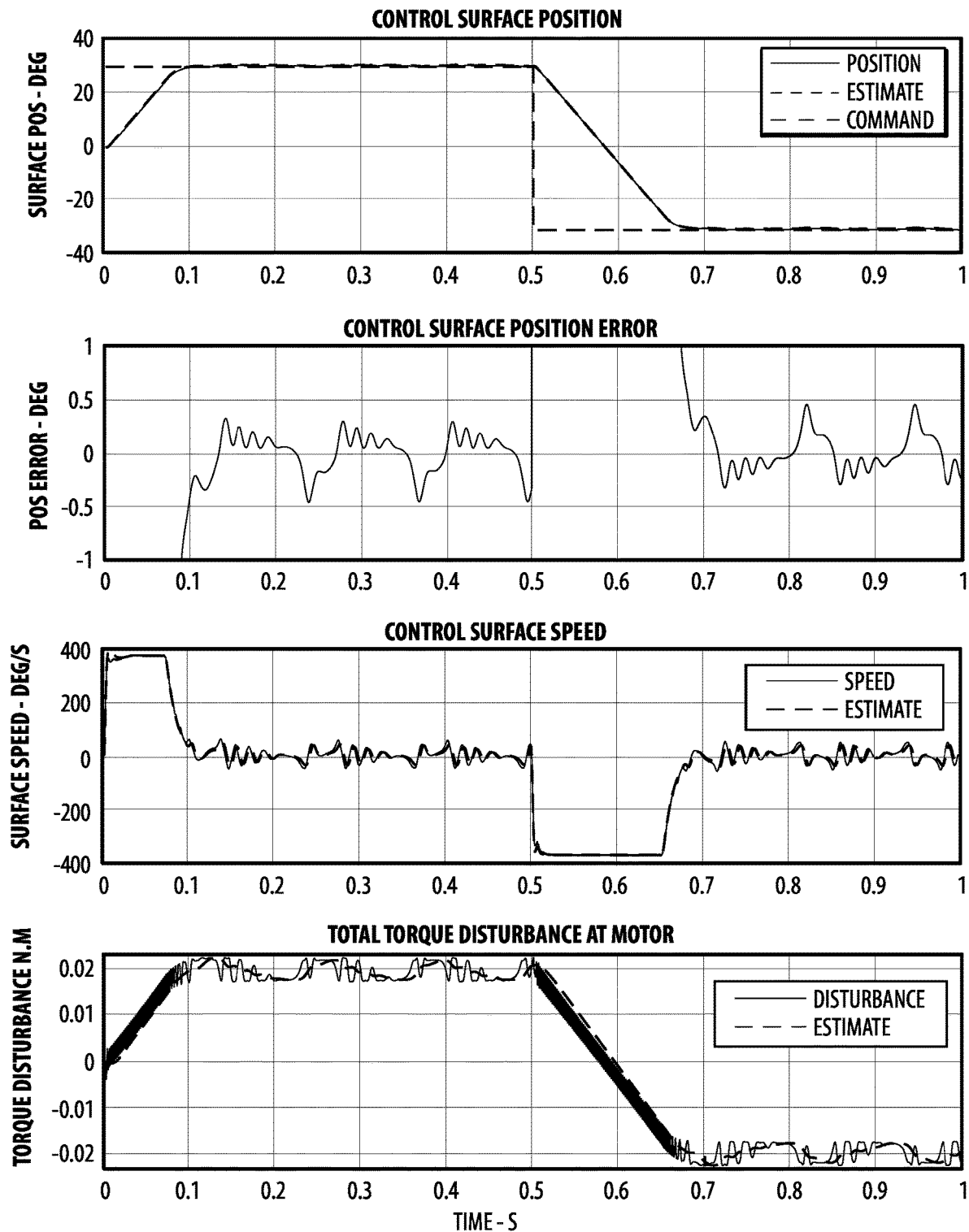
FIG. 5 is a set of graphs for torque ripple and cogging torque disturbance with low gain observance showing a graph for control surface position, a graph for control surface position error, a graph for control surface speed, and a graph for total torque disturbance at the motor.

FIG. 5 shows the simulation results for a square wave position command with a low gain observer bandwidth of 30 Hz when torque ripple and cogging torque are added to the "spring constant" load torque reflected at the motor. Again, as in the previous case, the low gain observer cannot keep up with the dynamics of the torque disturbances, resulting in significant surface position error oscillations.

Figure 6:
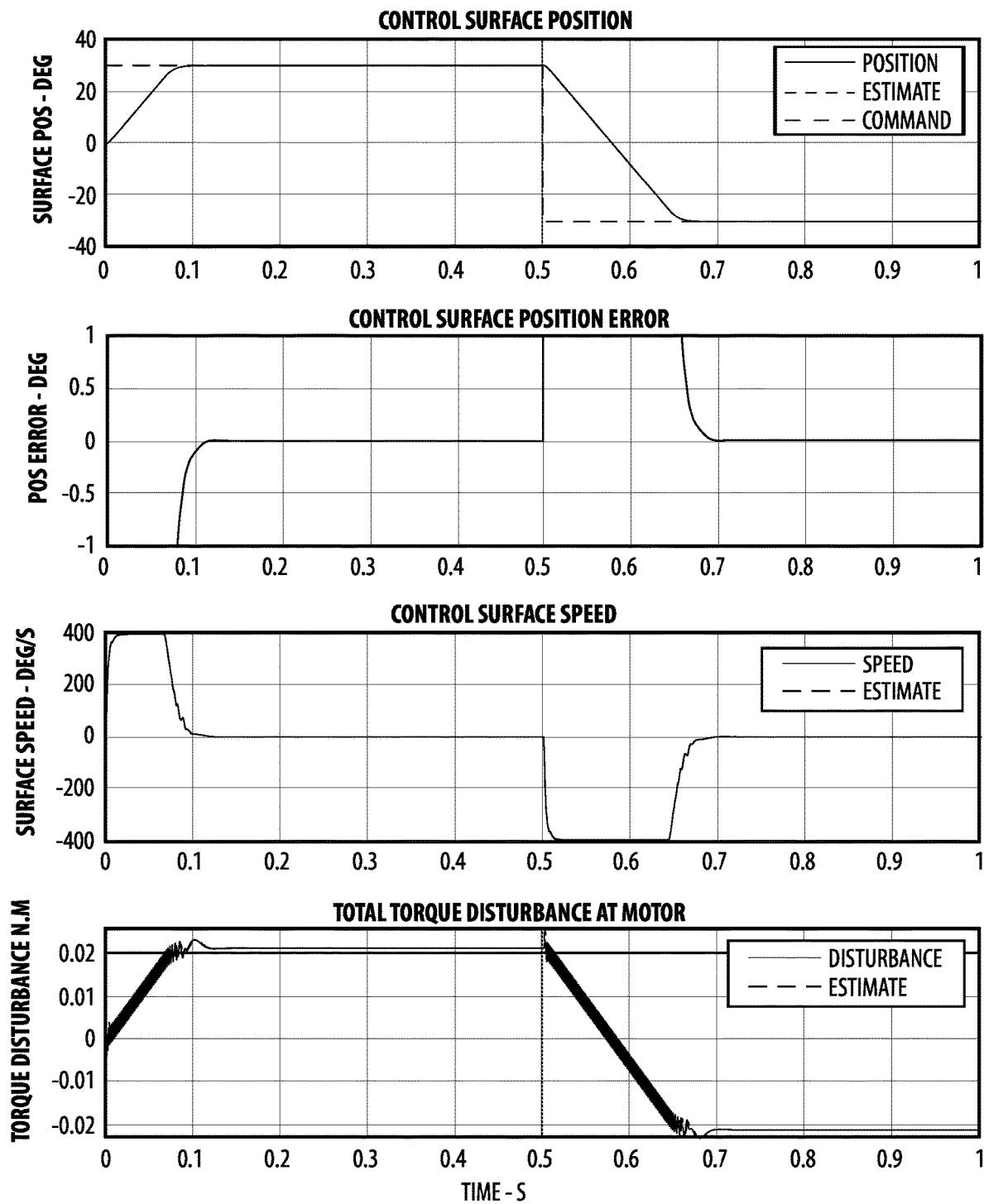
FIG. 6 is a set of graphs for cogging torque disturbance with high gain observer showing a graph for control surface position, a graph for control surface position error, a graph for control surface speed, and a graph for total torque disturbance at the motor.

FIG. 6 shows the simulation results for a square wave position command with a high gain observer bandwidth of 250 Hz when cogging torque is added to the "spring constant" load torque reflected at the motor. In contrast to FIG. 4, the high gain observer can estimate the dynamics of the cogging torque disturbance and the co-designed position controller correctly compensates resulting in nearly zero steady state error with no oscillations.

Figure 7:
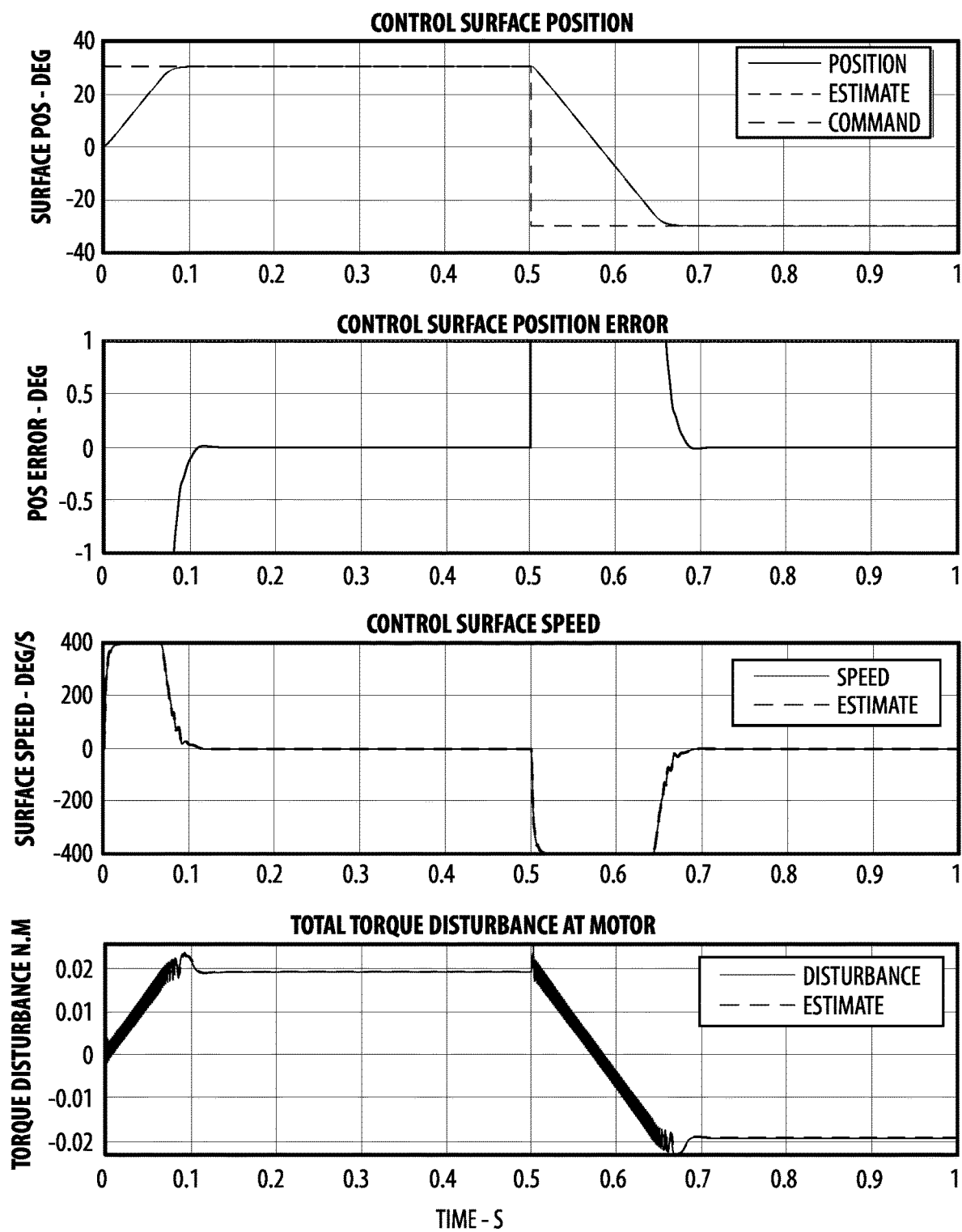
FIG. 7 is a set of graphs for torque ripple and cogging torque disturbance with high gain observer showing a graph for control surface position, a graph for control surface position error, a graph for control surface speed, and a graph for total torque disturbance at the motor.

FIG. 7 shows the simulation results for a square wave position command with a high gain observer bandwidth of 250 Hz when torque ripple and cogging torque are added to the "spring constant" load torque reflected at the motor. In contrast to FIG. 5 the high gain observer can estimate the combined disturbance torques so that the position controller achieves near zero steady state error with no oscillations.

Speed Control Examples

Figure 8:
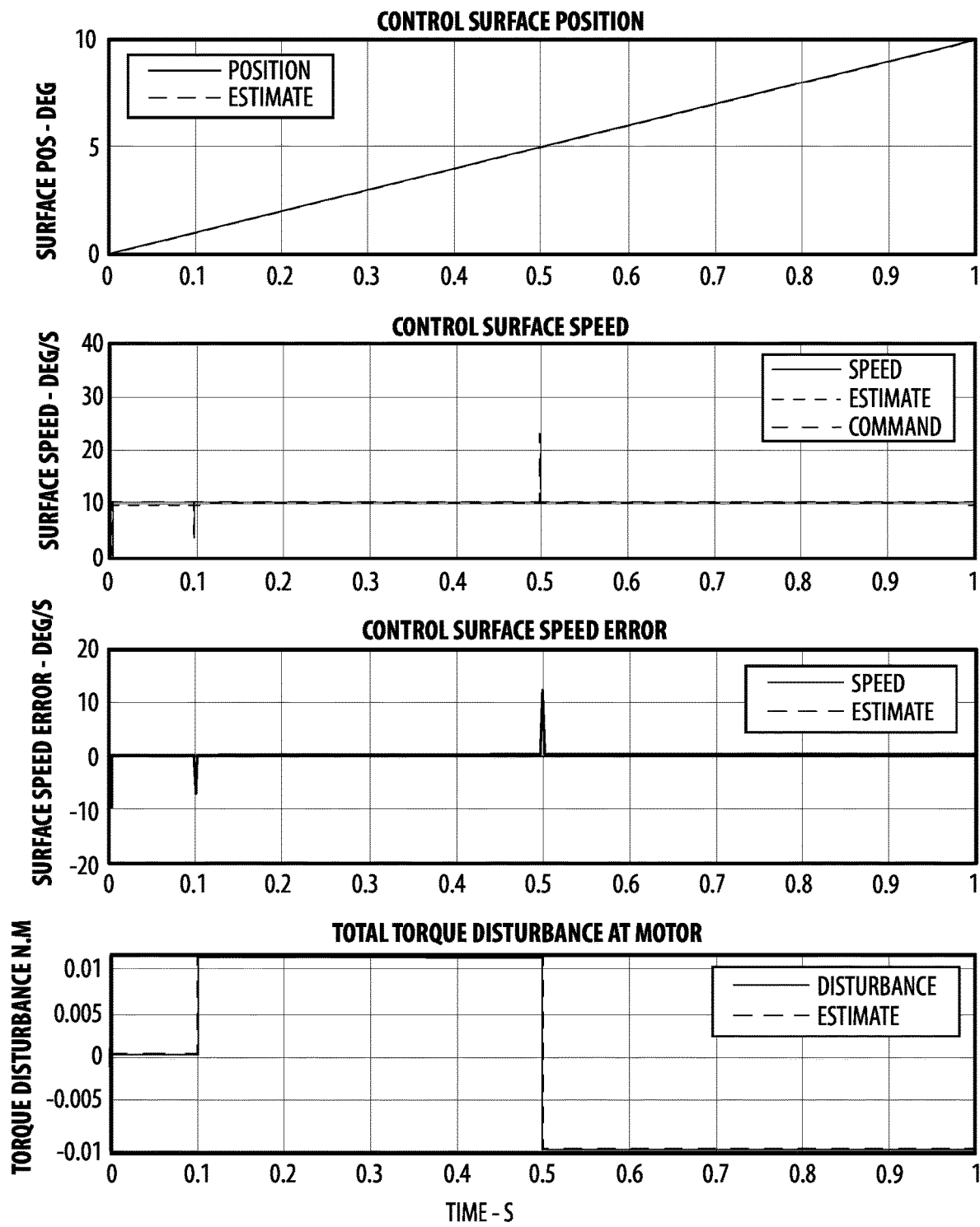
FIG. 8 is a set of graphs for speed control with sudden load torque disturbance showing a graph for control surface position, a graph for control surface position error, a graph for control surface speed, and a graph for total torque disturbance at the motor.
Figure 9:
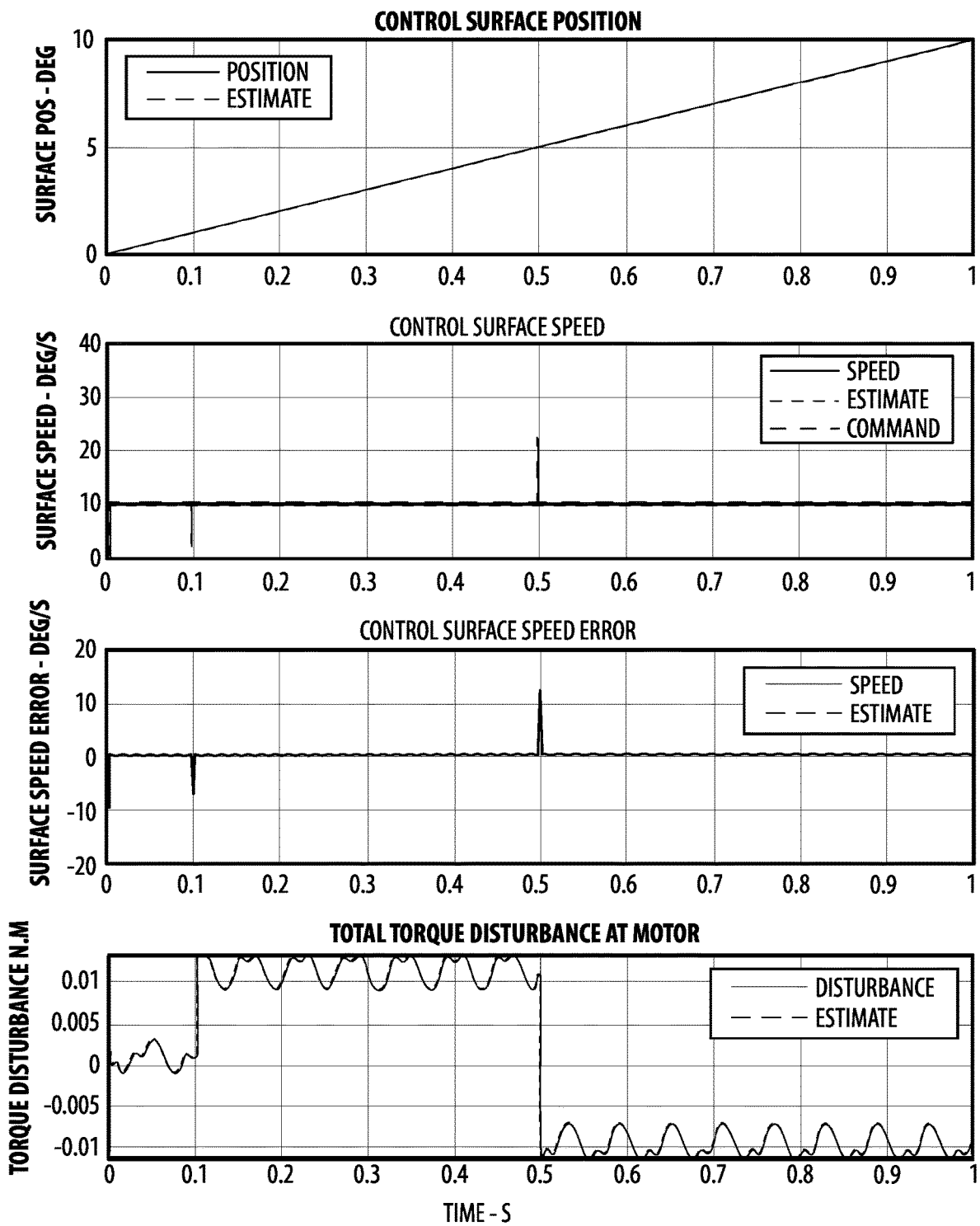
FIG. 9 is a set of graphs for speed control with sudden load torque disturbance and torque ripple and cogging torque showing a graph for control surface position, a graph for control surface position error, a graph for control surface speed, and a graph for total torque disturbance at the motor.

FIGS. 8 and 9 provide illustrative simulation examples of speed control. The figures each show plots of the surface position, surface speed, surface speed error, and total disturbance torque at the motor. Of interest is the ability of the speed controller to react to a sudden change in load torque and recover to maintain a desired speed.

For the purpose of simulation and to demonstrate a non-limiting example, the following simulation results for speed control, the controller parameters were used as shown in Table 3. Note that sample rates and bandwidths were increased to maintain accurate speed control. Both examples were performed with a high gain observer.

TABLE 3

Controller Design Parameter

| Parameter | Value |
|---|---|
| Controller Sample Rate | 24000 Hz |
| d-q Current Controller BW $\Omega_C$ | 1000 Hz |

TABLE 3-continued

Controller Design Parameter

| Parameter | Value |
| --- | --- |
| d-q Current Controller damping $\zeta_C$ | 1.0 |
| High-Gain Observer BW W | 1000 Hz |
| Surface Load Torque Spring Constant (A Priori Estimate) κ | 0 N · m/rad |
| Speed Controller BW $\Omega_s$ | 250 Hz |

FIG. 8 shows results for a constant speed control command of 10 deg/second with friction and an instantly changing load torque, but without torque ripple or cogging torque disturbances. The bottom subplot shows that the torque estimate accurately tracks the torque disturbance, and that speed control is accurately maintained before and quickly recovers after the instantaneous change in load torque FIG. 9 shows results for a constant speed control command of 10 deg/second with friction and an instantly changing load torque, and with torque ripple or cogging torque disturbances. The torque ripple and cogging torque cause significant oscillations in the total torque disturbance at the motor. Nevertheless, the bottom subplot shows that the torque estimate accurately tracks the torque disturbance, and that speed control is accurately maintained before and quickly recovers after the instantaneous change in load torque.

As shown in FIG. 1, an actuator 100 is shown. The actuator 100 is included in an airborne system, such as an aircraft, or missile, or guided projectile. Control surface 130 can be a fin, canard, stabilator, flap, aileron, rudder elevator, or other device of an airborne system that can be moved by an actuator motor 102 of the actuator 100, such as landing gear. The actuator 100 can be included within an airborne, waterborne, land borne, or subterranean system, such as a vehicle or pump, without limitation. When the control surface is moved, its position is changed at a rate of position change. When being moved, the control surface can be subjected to an external loading force. External loading force can be, for example, friction, air resistance, water resistance, etc. The external loading forces can include external loading torques, which may be constant, or vary linearly with deflection of the mechanism. The external loads may also be nonlinear or vary with external factors, for example flight condition. External loads applied to the control surface 130 in turn cause a reaction torque which must be overcome by transmission torque applied to the control surface 130 by the actuator 100.

Actuator 100 includes motor controller 106 which estimates in real time a reaction torque input to the actuator 100. Motor controller 106 receives load position commands from one or more external system controllers, such as an autopilot or a user interface. Motor controller 106 further reports feedback to the one or more external system controllers. The feedback includes estimates of the motor position and motor rotational rate. An inverter 142 of actuator 100 receives energy from an electric voltage source (not shown), such as a battery or generator. Actuator motor 102 receives current signals 146 from inverter 142 and converts the current signals 146 into a mechanical force, which is applied to a transmission unit 144. Transmission unit 144 can provide a gear to move the control surface 130. Transmission unit 144 relates a position of control surface 130 to the position of actuator motor 102, such as through a gear ratio, 1/N. Control surface 130 applies a load reaction torque to the transmission unit 144, wherein the load reaction torque is a reaction to a loading torque applied to the control surface 130 by external loading forces. The transmission torque applied by transmission unit 144 is configured to be sufficient to compensate for the load reaction torque applied by control surface 130.

Actuator 100 includes current sensors 146 and one or more current monitors 148 to measure and monitor each phase of current output by inverter 142. Output of the current monitors 148 is converted to the d-q frame by the Clark and Park transforms and provided to the motor controller 106 as id and iq current feedbacks (114). Actuator 100 further includes a position encoder 112 configured to measure motor position, e.g., in terms of angular rotation or linear translation. Output of the position encoder 112 is provided to motor controller 106 as motor position feedback.

A method of controlling an actuator 100, as shown in FIG. 1, includes transmitting a drive signal to an actuator motor 102, as shown in FIG. 1-2, to move a device 130 such as a control surface for an airborne platform such as an airplane, guided munition, or the like. The method includes automatically compensating for and rejecting uncertain and unmodeled torque disturbances of the actuator motor 102. Those skilled in the art will readily appreciate that the method does not need to be applied to a control surface but may be applied in any suitable application where disturbances may affect motor control in an actuator.

Automatically compensating for and rejecting uncertain and unmodeled torque disturbances can include detecting and compensating for the torque disturbances to maintain accurate position and speed of the actuator motor 102. In certain embodiments, automatically compensating for and rejecting uncertain and unmodeled torque disturbances can include using an extended high gain observer 104, as shown in FIG. 3, to specifically estimate and compensate for high frequency disturbances in the actuator motor.

The high gain observer 104 can incorporate angular wrap-around to permit unlimited integration of motor rotor position for the actuator motor 102. In certain embodiments, the high frequency disturbances can include at least one of time varying load torques, friction, cogging torque, and torque ripple. In certain embodiments, transmitting a drive signal can include commanding the actuator motor 102 for at least one of speed control of the actuator motor or position control of the actuator motor 102.

The method can further include rate limiting speed of the actuator motor 102 by imposing saturation limits on motor position error of the actuator motor 102.

With reference, to FIG. 2, the motor controller 106 receives position commands, e.g., control surface, position, and speed commands, shown by arrow 108. The motor controller 106 receives motor position feedback, shown by arrow 110, from a position encoder 112. Motor controller 106 receives quadrature current and direct current feedback, $i_q$ and $i_d$, shown by arrow 114, from d-q current model 116. Motor controller 106 sends quadrature voltage and direct voltage feedback, V and $v_d$, shown by arrow 118, to the d-q current model 116. The d-q current model receives voltage feedback, $v_q$ and $v_d$, 118 commands and motor position speed 124 feedback, and sends a torque command, shown by arrow 120, to a motor rotor model 122. The motor rotor model 122 receives torque 120 feedback and sends a motor position/speed command, shown by arrow 124, to a transmission 126. The transmission 126 physically transmits surface position and speed, shown by arrow 128, to a control surface 130.

With reference to FIG. 3, the method can further include receiving surface position and surface speed commands 108 for the actuator motor 102, as indicated in FIG. 3 by the arrow 110. The method includes receiving motor position feedback for the actuator motor 102. Receiving direct current feedback from the actuator motor 102, and receiving quadrature current feedback from the actuator motor 102, shown by arrows 114. The method can further include using a high gain observer 104 receiving the motor position feedback 110 and quadrature current feedback 114 to determine a position estimate 136, a torque estimate 138, and a speed estimate 140. The method can further include using a surface position/speed controller 134 receiving the position estimate 136, the torque estimate 138, the speed estimate 140, and the surface position 108 and surface speed 108 commands to determine a quadrature current command. The d-q current controller 132 receives the quadrature current command, the speed estimate 140, the quadrature current feedback, and the direct current feedback to output a command for direct current voltage and a command for quadrature voltage for controlling the actuator motor 102.

The d-q current controller 132 can output the direct current voltage command and the quadrature voltage command 118 to the actuator motor 102 as three-phase, pulse width modulated (PWM) signals. The actuator motor 102 can be connected to actuate a control surface 130 of an airborne platform. A controller 102 as shown in FIG. 1-2 for an actuator 100 includes a processing device configured to perform the methods disclosed herein.

Embodiments can include any suitable computer hardware and/or software module(s) to perform any suitable function (e.g., as disclosed herein). As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware, firmware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a field programmable gate array (FPGA), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language, or firmware programming language such as HDL, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

$$k_T = k_{T_{bldc}}/\sqrt{3}R_{bldc}$$

The methods and systems of the present disclosure, as described above and shown in the drawings, provide for precision position and/or speed control of actuators in the presence of unknown, nonlinear, time varying torque disturbances such as time varying load torques, friction, torque ripple, and cogging torque. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of controlling an actuator comprising:
   receiving surface position and surface speed commands for an actuator motor;
   receiving motor position feedback for the actuator motor;
   receiving direct current feedback from the actuator motor;
   receiving quadrature current feedback from the actuator motor;
   using a high gain observer receiving the motor position feedback and quadrature current feedback to determine a position estimate, a torque estimate, and a speed estimate;
   using a surface position/speed controller receiving the position estimate, the torque estimate, the speed estimate, and the surface position and surface speed commands to determine a quadrature current command;
   using a d-q current controller receiving the quadrature current command, the speed estimate, the quadrature current feedback, and the direct current feedback to output a command for direct current voltage and a command for quadrature voltage for controlling the actuator motor; and
   transmitting the command for the direct current voltage and the command for the quadrature voltage as a drive signal to an actuator motor to move a device, including automatically compensating for and rejecting uncertain and unmodeled torque disturbances of the actuator motor.

2. The method as recited in claim 1, wherein automatically compensating for and rejecting uncertain and unmodeled torque disturbances includes:
   detecting and compensating for the torque disturbances to maintain accurate position or speed of the actuator motor.

3. The method as recited in claim 1, wherein automatically compensating for and rejecting uncertain and unmodeled torque disturbances includes:
   using the high gain observer to specifically estimate and compensate for high frequency disturbances in the actuator motor.

4. The method as recited in claim 1, wherein the high gain observer incorporates angular wrap-around to permit unlimited integration of motor rotor position for the actuator motor.

5. The method as recited in claim 3, wherein the high frequency disturbances include at least one of time varying load torques, friction, cogging torque, and torque ripple.

6. The method as recited in claim 1, wherein transmitting the drive signal includes commanding the actuator motor for at least one of speed control of the actuator motor or position control of the actuator motor.

7. The method as recited in claim 1, further comprising:
   imposing saturation limits on motor position error of the actuator motor to rate limit the motor speed.

8. The method as recited in claim 1, wherein the d-q current controller outputs the direct current voltage command and the quadrature voltage command to the actuator motor as three-phase, pulse width modulated (PWM) signals.

9. The method as recited in claim 8, wherein the actuator motor is connected to actuate a control surface of an airborne platform.

10. A controller for an actuator comprising:
a processing device configured to:
receive surface position and surface speed commands for the actuator motor;
receive motor position feedback for the actuator motor;
receive direct current feedback from the actuator motor;
receive quadrature current feedback from the actuator motor;
use a high gain observer receiving the motor position feedback and quadrature current feedback to determine a position estimate, a torque estimate, and a speed estimate;
use a surface position/speed controller receiving the position estimate, the toque estimate, the speed estimate, and the surface position and surface speed commands to determine a quadrature current command;
use a d-q current controller receiving the quadrature current command, the speed estimate, the quadrature current feedback, and the direct current feedback to output a command for direct current voltage and a command for quadrature voltage for controlling the actuator motor; and
transmit the command for the direct current voltage and the command for the quadrature voltage as a drive signal to an actuator motor to move a device, including automatically compensating for and rejecting uncertain and unmodeled torque disturbances of the actuator motor.

11. The controller as recited in claim 10, wherein automatically compensating for and rejecting uncertain and unmodeled torque disturbances includes:
detecting and compensating for the torque disturbances to maintain accurate position or speed of the actuator motor.

12. The controller as recited in claim 10, wherein automatically compensating for and rejecting uncertain and unmodeled torque disturbances includes:
Using the high gain observer to specifically estimate and compensate for high frequency disturbances in the actuator motor.

13. The controller as recited in claim 10, wherein the high gain observer incorporates angular wrap-around to permit unlimited integration of motor rotor position for the actuator motor.

14. The controller as recited in claim 12, wherein the high frequency disturbances include at least one of time varying load torques, friction, cogging torque, and torque ripple.

15. The controller as recited in claim 10, wherein transmitting the drive signal includes commanding the actuator motor for at least one of speed control of the actuator motor or position control of the actuator motor.

16. The controller as recited in claim 10, wherein the processing device is configured to:
impose saturation limits on motor position error of the actuator motor to rate limit motor speed.

17. The controller as recited in claim 10, wherein the d-q current controller is configured to output the direct current voltage command and the quadrature voltage command to the actuator motor as three-phase, pulse width modulated (PWM) signals.

18. The controller as recited in claim 17, wherein the actuator motor is connected to actuate a control surface of an airborne platform.

19. A method of controlling an actuator comprising:
receiving surface position or surface speed commands for an actuator motor;
receiving motor position feedback for the actuator motor;
receiving direct current feedback from the actuator motor;
receiving quadrature current feedback from the actuator motor;
using a high gain observer receiving the motor position feedback and quadrature current feedback to determine a position estimate, a torque estimate, and a speed estimate;
using a surface position/speed controller receiving the position estimate, the torque estimate, the speed estimate, and the surface position or surface speed commands to determine a quadrature current command;
using a d-q current controller receiving the quadrature current command, the speed estimate, the quadrature current feedback, and the direct current feedback to output a command for direct current voltage and a command for quadrature voltage for controlling the actuator motor;
transmitting the command for the direct current voltage and the command for the quadrature voltage to an actuator motor; and
commanding the actuator motor for at least one of speed control of the actuator motor or position control of the actuator motor to move a device to compensate for and reject uncertain and unmodeled torque disturbances of the actuator motor.

20. The method as recited in claim 19, wherein the high gain observer incorporates angular wrap-around to permit unlimited integration of motor rotor position for the actuator motor.

* * * * *